(12) United States Patent
Nishidate (10) Patent No.: US 8,468,553 B2
(45) Date of Patent: Jun. 18, 2013

(54) OPTICAL ELEMENT ADJUSTMENT STRUCTURE AND OPTICAL PICKUP

(75) Inventor: Tetsuo Nishidate, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/348,806

(22) Filed: Jan. 12, 2012

(65) Prior Publication Data

US 2012/0198484 A1     Aug. 2, 2012

(30) Foreign Application Priority Data

Jan. 28, 2011 (JP) ................... 2011-016845

(51) Int. Cl.
*G11B 17/028* (2006.01)
(52) U.S. Cl.
USPC .......................................................... 720/675
(58) Field of Classification Search
USPC .......................................................... 720/675
See application file for complete search history.

(56) References Cited

U.S. PATENT DOCUMENTS

| 7,137,132 B2 * | 11/2006 | Sogawa et al. | 720/652 |
| 2008/0080340 A1 * | 4/2008 | Nishiyama et al. | 369/44.37 |
| 2011/0067041 A1 * | 3/2011 | Akutsu et al. | 720/703 |

FOREIGN PATENT DOCUMENTS

| JP | 64-42516 U | 3/1989 |
| JP | 2-76320 U | 6/1990 |
| JP | 11-110775 | 4/1999 |
| JP | 2002-288863 | 10/2002 |
| JP | 2005-018845 | 1/2005 |

OTHER PUBLICATIONS

Japanese Office Action dated Dec. 18, 2012 for corresponding patent application No. JP2011-016845.

* cited by examiner

*Primary Examiner* — Mark Blouin
(74) *Attorney, Agent, or Firm* — Morgan, Lewis & Bockius LLP (57) ABSTRACT

The optical element adjustment structure is provided with a rotating side including an optical element to be rotationally adjusted, and a non-rotating side where the rotationally adjusted optical element is securely arranged. The rotating side includes a tapered distal end section, and a contact section provided in an end section on a side opposite the distal end section and adapted to be contacted by an adjustment jig. The non-rotating side includes a recessed section for engaging the distal end section. The adjustment jig contacting the contact section is moved, whereby the rotating side rotates, the distal end section engaged in the recessed section being used as a fulcrum, and the optical element is rotationally adjusted.

7 Claims, 9 Drawing Sheets

OPTICAL ELEMENT ADJUSTMENT STRUCTURE AND OPTICAL PICKUP

This application is based on Japanese Patent Application No. 2011-016845 filed on Jan. 28, 2011, the contents of which are hereby incorporated by reference.

BACKGROUND OF THE INVENTION

1. Field of the Invention

The present invention relates to an optical element adjustment structure used, for example, to perform rotational adjustment of a diffraction grating or other optical element. The invention also relates to an optical pickup provided with such an optical element adjustment structure.

2. Description of Related Art

A diffraction grating for splitting light emitted from a light source is sometimes disposed in optical pickup optical systems of the conventional art (see, for example, JP-A-2005-18845 and JP-A-11-110775). Due to the presence of the diffraction grating, it becomes possible to employ, for example, a three-beam method, a differential push-pull (DPP) method, or another method to generate a tracking error signal.

Typically, a diffraction grating is secured to a base (optical stage) of the optical pickup after rotational adjustment has been performed to bring the positions of a plurality of spots of light formed on an optical disk to target positions. In some cases, diffraction gratings are formed of resin, while in other cases they are formed of glass. Blu-Ray (BD) disks and other optical disks that can record large volumes of information have become commercially viable of late, and currently, most diffraction gratings provided to BD-compatible optical pickups are formed using glass rather than resin.

When formed using glass, the diffraction grating is typically attached to the base of the optical pickup in a state of being held by a holder (optical element holder), and rotational adjustment of the diffraction grating is performed while the holder is caused to rotate. When formed using resin, the diffraction grating is sometimes held in a holder, or at other times is attached to the base of the optical pickup in the form of a single member having both the function of a diffraction grating and the function of a holder.

Figure 10:
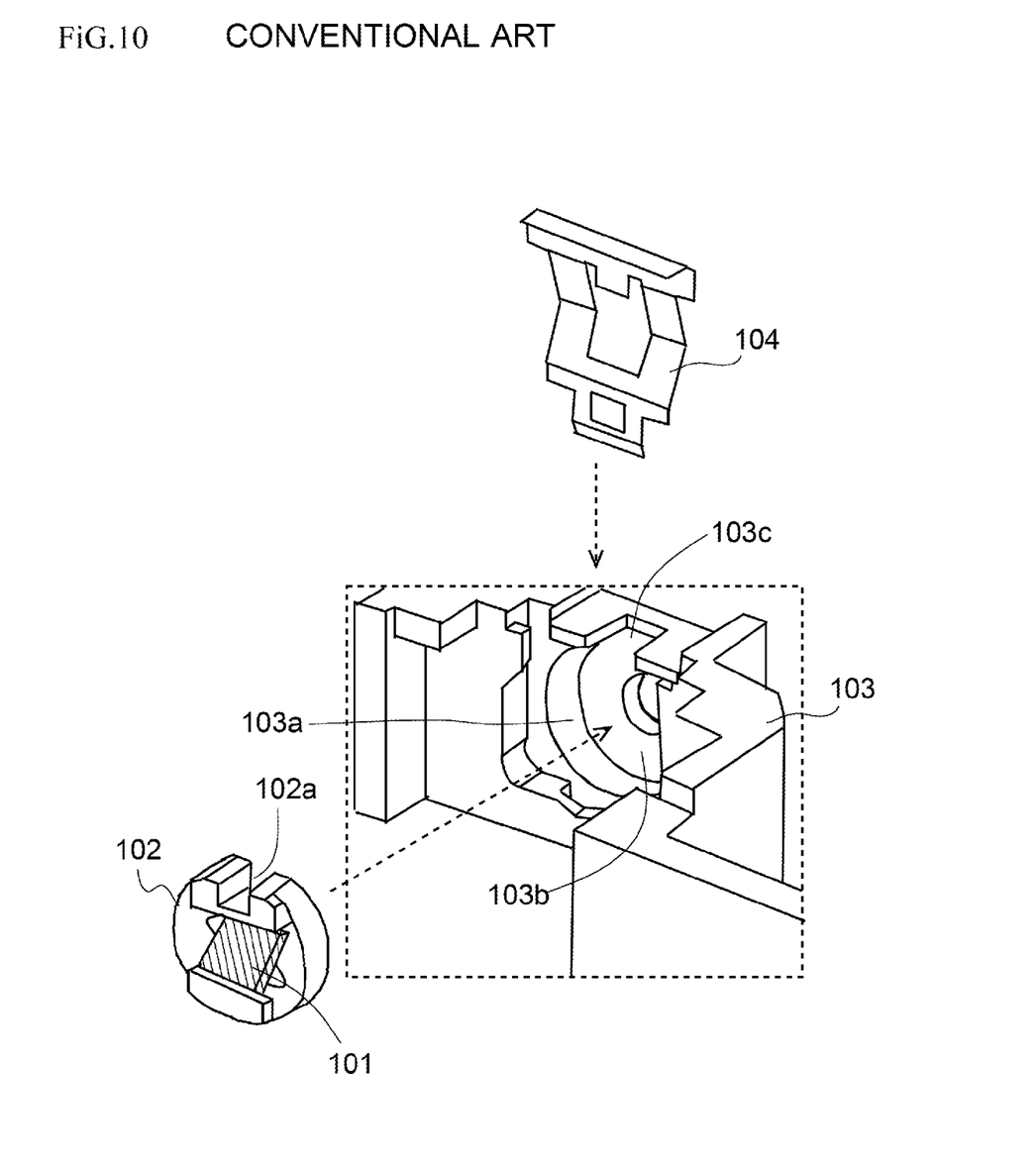
FIG. 10 is a schematic perspective view showing a diffraction grating prior to attachment to a base, in a conventional art optical pickup.
Figure 11:
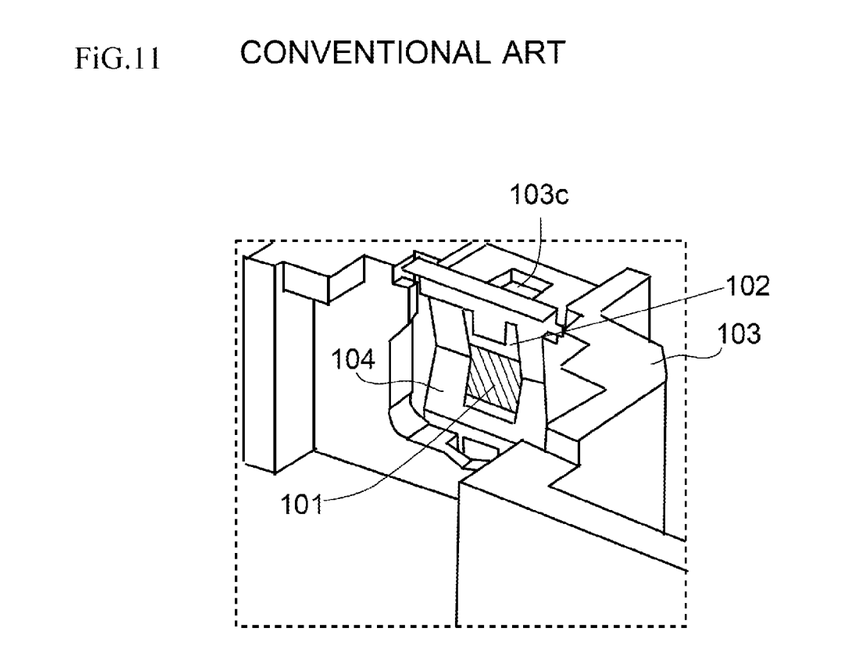
FIG. 11 is a schematic perspective view showing the diffraction grating attached to a base, in a conventional art optical pickup.

A conventional art configuration example where a diffraction grating is held in a holder for attachment to the base of an optical pickup will now be described. FIG. 10 is a schematic perspective view showing a diffraction grating prior to attachment to a base in a conventional art optical pickup. FIG. 11 is a schematic perspective view showing a diffraction grating attached to a base in a conventional art optical pickup.

As shown in FIG. 10, in the conventional art optical pickup, a substantially cylindrical holder 102 made of resin is employed as the holder for holding a diffraction grating 101. The diffraction grating 101 is anchored in a substantially center section of the holder 102 using an adhesive or the like. The holder 102 holding the diffraction grating 101 is housed within a hollow, substantially cylindrical housing space 103a provided to a base 103 of the optical pickup.

As shown in FIG. 11, the holder 102 housed within the housing space 103a is pressed against an abutment face 103b of the base 103 by a spring 104 arranged on the back of the holder 102 (see FIG. 10). Specifically, the holder 102 is held in a state of being housed within the housing space 103a through the action of the spring 104. However, as mentioned previously, the diffraction grating 101 must be rotationally adjusted. For this reason, the urging force of the spring 104 is adjusted such that rotational adjustment may be performed with the holder 102 pressing against the abutment face 103b.

As shown in FIG. 10, an adjustment slot 102a into which an adjustment tool is inserted is formed in the holder 102. As shown in FIGS. 10 and 11, a cutout 103c into which an adjustment tool is inserted is formed in the optical pickup base 103. Accordingly, rotational adjustment of the holder 102 housed within the housing space 103a and pressed against the abutment face 103b by the spring 104 may be performed using the adjustment tool. Once rotational adjustment has been performed using the adjustment tool, the holder 102 is secured to the base 103 using an adhesive or the like so that no movement occurs. Securing the holder 102 using the adhesive or the like completes attachment of the diffraction grating 101 to the base 103.

SUMMARY OF THE INVENTION

Figure 12:
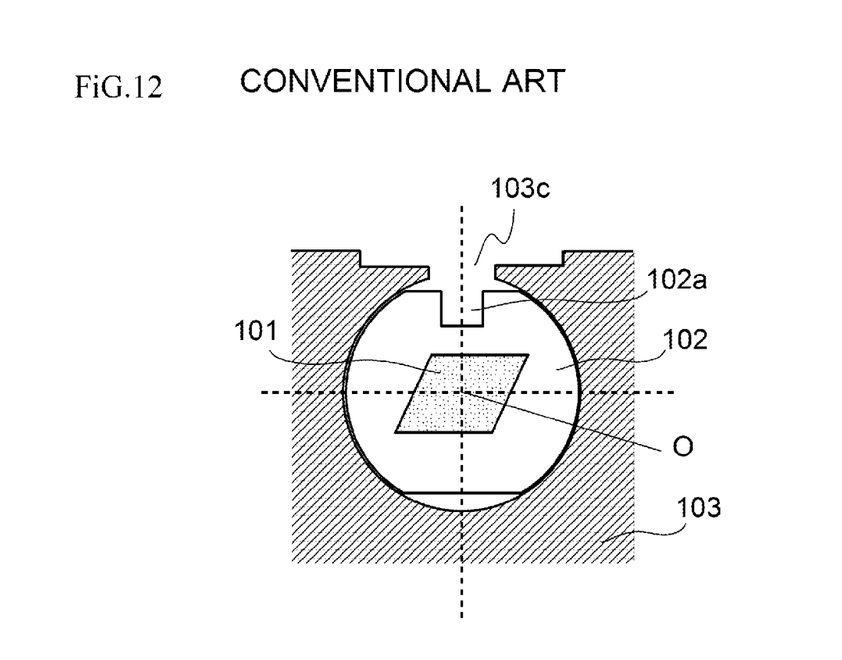
FIG. 12 is a schema for describing a problematic aspect of the conventional art optical pickup.

Problems encountered in the configuration of the conventional art discussed above shall next be described with reference to FIG. 12. Where rotational adjustment of the diffraction grating 101 is performed in the configuration of the conventional art, an adjustment jig (adjustment pin), not shown, is inserted into an adjustment slot 102a, and the adjustment pin is moved in the left-right direction in FIG. 12. In so doing, the holder 102 is rotated about a center of rotation at the center O of the circular holder 102, and rotational adjustment of the diffraction grating 101 is performed.

However, with this configuration, the distance between the center of rotation O and the contacting section (slotted section 102a) where contact is made between the adjustment pin and the holder 102 tends to be short. In such a case, the proportion of angular change of the diffraction grating 101 associated with movement of the adjustment pin moving to the left or right tends to be rather large, creating the problem of diminished adjustment accuracy.

Moreover, in the configuration of the conventional art, after rotational adjustment has been performed using the adjustment pin, the vicinity of the slotted section 102a is adhesively secured to the base 103. In this case, normally, the site of contact between the outside perimeter of the holder 102 and the inner face of the housing space 103a of the base 103 (see FIG. 10) is not constant; its position differs with each adjustment task. Because of this, when the holder 102 moves (when the above-discussed site of contact changes) within the housing space 103a, such as may occur when a temperature change arises around the diffraction grating 101, when shock is encountered, or when other circumstances occur, there is a possibility of the optical element shifting from its adjustment position.

Diffraction grating adjustment structures different from the aforedescribed configuration examples are disclosed in JP-A-2005-18845 and JP-A-11-110775. However, the configuration of JP-A-2005-18845, like the conventional art example discussed previously, is a configuration in which an adjustment is made to the angular position of the diffraction grating about an optical axis (the center of the diffraction grating), and adjustment accuracy is readily diminished. Moreover, when a temperature change arises around the diffraction grating, or when subjected to shock, or the like, the susceptibility of the holder to moving so that the optical element shifts from the adjustment position remains unchanged.

The configuration of JP-A-11-110775 is one in which a resin holder is supported utilizing a friction projection provided to the holder, and positional displacement occurring due to a shock or the like is a concern. Also, in the configuration of JP-A-11-110775, dimensioning of the friction projection is considered crucial for preventing positional displacement due to shock or the like, which can present a manufacturing constraint.

In view of this point, it is an objective of the present invention to offer an optical element adjustment structure suitable for an optical element that requires rotational adjustment. More specifically, there is provided an optical element adjustment structure affording good adjustment accuracy. There is also provided an optical element adjustment structure resistant to positional displacement arising due to temperature change, shock, or other event subsequent to rotational adjustment. Yet another object of the present invention is to provide an optical pickup having high reliability due to the use of such an optical element adjustment structure.

The optical element adjustment structure of the present invention for attaining the aforedescribed objectives is an optical element adjustment structure comprising: a rotating side including an optical element to be rotationally adjusted; and a non-rotating side where the rotationally adjusted optical element is securely arranged; wherein the rotating side includes a tapered distal end section, and a contact section provided on an end section on a side opposite the distal end section and adapted to be contacted by an adjustment jig; the non-rotating side includes a recessed section for engaging the distal end section; and the adjustment jig contacting the contact section is moved, whereby the rotating side rotates, the distal end section engaged in the recessed section being used as a fulcrum, and the optical element is rotationally adjusted.

According to the present aspect, since the fulcrum (distal end section) of rotation of the rotating side and the contact section contacted by the adjustment jig can be configured so as to be in positions that are set apart, the proportion of angular change of the optical element associated with movement of the adjustment jig can be lessened, and improved adjustment accuracy is achieved. Also, according to the present aspect, the distal end section serving as the fulcrum of rotation of the rotating side engages a recessed section on the non-rotating side, and a configuration can be adopted whereby the optical element tends not to be positionally displaced due to temperature change, shock, or other event, subsequent to rotational adjustment.

In an optical element adjustment structure having the aforedescribed configuration, the distal end section and the recessed section are preferably substantially V-shaped. As a consequence thereof, the distance between the center of rotation and the contact section contacted by the adjustment jig is greater so that improved adjustment accuracy is achieved, and the likelihood that positional displacement of the optical element will arise due to temperature change, shock, or other event, subsequent to rotational adjustment, can be reduced.

In an optical element adjustment structure of the aspect described above, the rotating side may be configured such that the optical element holder holds the optical element; and the distal end section and the contact section may be configured to be included in the optical element holder. The rotating side may be configured so as to be made of the optical element alone, or of the optical element and the holder in an integrated arrangement, in which case these components will undergo rotational adjustment.

In an optical element adjustment structure of the aspect described above, in preferred practice, the optical element holder has a spring section; the non-rotating side includes two wall sections arranged in opposition; and rotational adjustment of the optical element is performed in a state of the optical element holder being pressed against the two wall sections by the action of the spring section. In this configuration, the optical element holder is preferably obtained by working sheet metal.

Where the optical element holder is obtained by working sheet metal, the spring section is readily provided in an integrated manner to the optical element holder. Since the optical element holder can be attached to an object for attachment (non-rotating side; the base of the optical pickup or the like) utilizing the spring section, the task for attaching the optical element holder to the object for attachment is more readily accomplished.

The optical pickup of the present invention for attaining the aforedescribed objectives is configured so as to be provided with an optical element adjustment structure having the aforedescribed configuration. According to the present aspect, a highly reliable optical pickup can be offered because rotational adjustment of the optical element can be performed with good accuracy; and it is less likely that positional displacement of the optical element will arise due to temperature change, shock, or other event.

In the optical pickup of the aforedescribed configuration, the optical element may be a diffraction grating. In many cases, diffraction gratings provided to optical pickups require rotational adjustment, and the present configuration is a suitable configuration example of the present invention.

Thus, according to the present invention, there can be offered an optical element adjustment structure suitable for an optical element requiring rotational adjustment. Also, according to the present invention, there can be offered a high-reliability optical pickup owing to the use of such an optical element adjustment structure.

DETAILED DESCRIPTION OF PREFERRED EMBODIMENTS

Embodiments of the optical element adjustment structure and the optical pickup of the present invention will be described below with reference to the drawings. There is described below an example in which the optical element adjustment structure of the present invention is an adjustment structure for a diffraction grating, and the diffraction grating adjustment structure is implemented in an optical pickup.

Figure 1A:
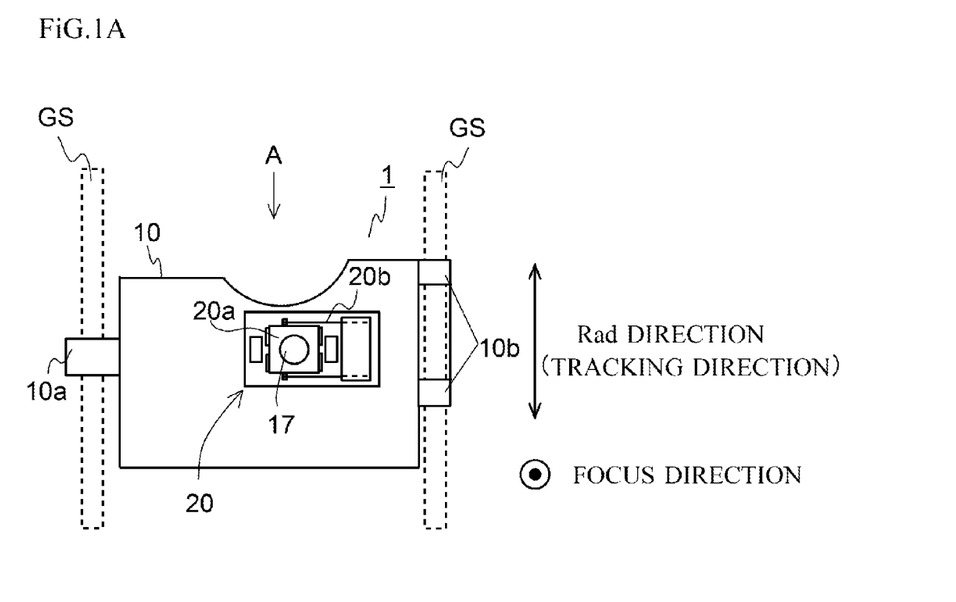
FIG. 1A is a schematic top view showing a configuration of an optical pickup of the present embodiment.
Figure 1B:
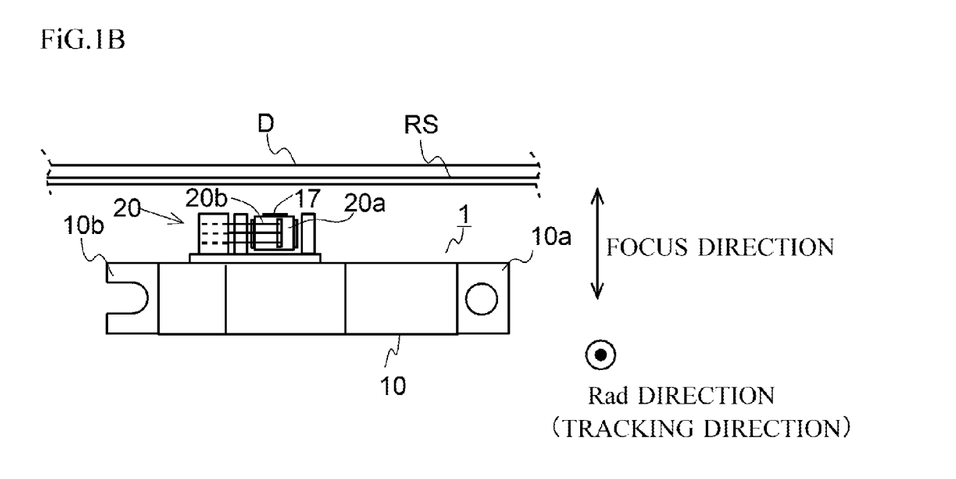
FIG. 1B is a schematic side view showing the configuration of the optical pickup of the present embodiment.

FIG. 1A and FIG. 1B are schematic plan views showing a configuration of an optical pickup of the present embodiment, wherein FIG. 1A is a top view of the optical pickup and FIG. 1B is a side view of the optical pickup. FIG. 1B is a view taken along arrow A shown in FIG. 1A. To facilitate understanding, an optical disk D is also shown in FIG. 1B.

As shown in FIG. 1A and FIG. 1B, an optical pickup 1 of the present embodiment is configured to be provided with a pickup base 10, on which are placed a plurality of optical members including a diffraction grating, and an objective lens actuator 20 securely arranged on the pickup base 10.

Bearing sections 10a, 10b are provided in the left and right end sections of the pickup base 10. These bearing sections 10a, 10b slidably support the pickup base 10 on guide shafts GS (shown by broken lines in FIG. 1A) provided to an optical disk device (a device for playback or recording of the optical disk D). The guide shafts GS provided to the optical disk device are arranged so as to extend in a radial direction (Rad direction) of the optical disk. The optical pickup 1 that is capable of sliding on the guide shafts GS can access desired addresses on the rotating optical disk D to read and write information.

The objective lens actuator 20 is a device in which an objective lens 17 provided to the optical system of the optical pickup 1 can be moved in a focus direction (a direction perpendicular to an information recording surface RS of the optical disk D) and in a tracking direction (the same direction as the Rad direction). During reading and writing of information in the optical pickup 1, it is necessary to perform focusing control so that the focal point of the objective lens 17 is always positioned on the information recording surface RS of the optical disk D. Also, during reading and writing of information in the optical pickup 1, it is necessary to perform tracking control so that the positions of light spots focused onto the information recording surface RS of the optical disk D by the objective lens 17 always follow the track of the optical disk D. The objective lens actuator 20 is driven while the focusing control and tracking control are performed.

The objective lens actuator 20 has a lens holder 20a for holding the objective lens 17, and is configured such that the lens holder 20a is slidably supported by a wire 20b. The objective lens actuator 20 moves the objective lens 17 together with the lens holder 20a through the use of force generated utilizing a coil and magnet. This type of objective lens actuator is publicly known, and accordingly will not be described in detail herein.

Figure 2:
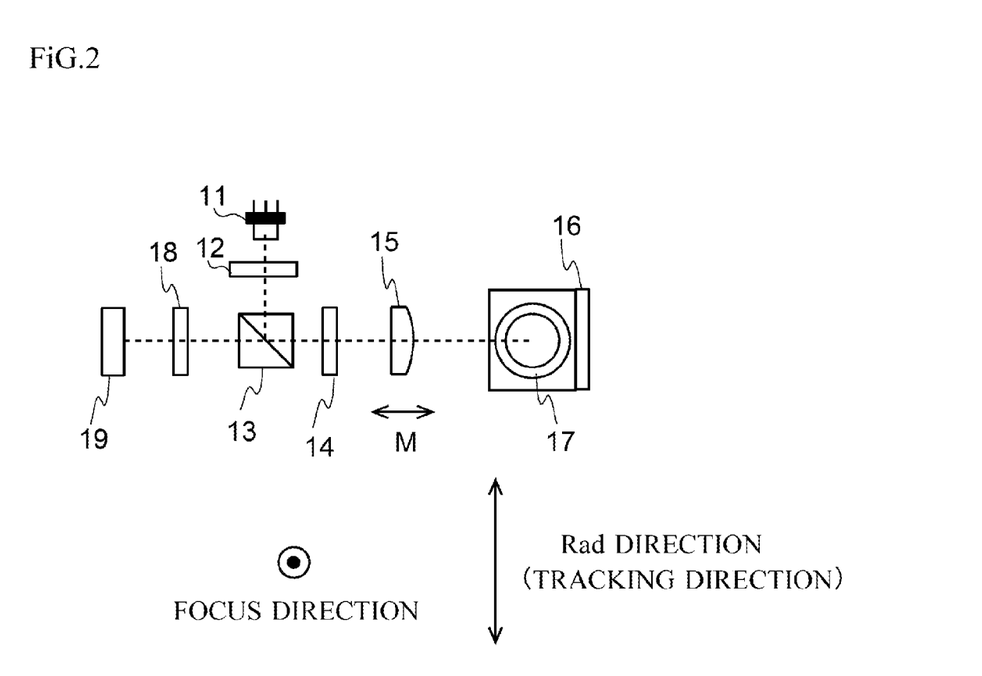
FIG. 2 is a schematic plan view showing the optical configuration of the optical pickup of the present embodiment.

FIG. 2 is a schematic plan view showing the optical configuration of the optical pickup of the present embodiment. The type of semiconductor laser 11 will be determined by the type of optical disk D with which the optical pickup 1 is compatible (able to read and write information). For example, if the optical pickup 1 is BD-compatible, the semiconductor laser 11 used will be one from which emits a laser beam of a 405-nm wavelength band.

The laser beam exiting the semiconductor laser 11 travels to a diffraction grating 12. The diffraction grating 12 divides the impinging laser beam into a principal ray and two secondary rays. Because of this, the laser beam exiting the semiconductor laser 11 is divided into three rays before reaching the optical disk D. In the present embodiment, the diffraction grating 12 is arranged in the optical system of the optical pickup 1 so as to be able to obtain a tracking error signal by the DPP method. The method for obtaining a tracking error signal by the DPP method is publicly known, and will not be described herein.

The laser beam exiting the diffraction grating 12 travels to a polarizing beam splitter 13. The polarizing beam splitter 13 reflects S-polarized light (a non-limiting example being linearly polarized light) exiting the semiconductor laser 11. The laser beam reflected by the polarizing beam splitter 13 is converted to circularly polarized light by a quarter-wave plate 14. The laser beam exiting the quarter-wave plate 14 is transmitted through a collimator lens 15, and is thereafter reflected by a raising mirror 16. The laser beam reflected by the raising mirror 16 reaches the objective lens 17 above the raising mirror 16. The objective lens 17 has the function of focusing the impinging laser beam onto the information recording surface RS of the optical disk D.

Once the light has been focused onto the information recording surface RS by the objective lens 17, the reflected light (returning light) reflected by the information recording surface RS passes through the objective lens 17, and is thereafter reflected by the raising mirror 16. The returning light then passes through the collimator lens 15, undergoes a conversion to P-polarized light by the quarter-wave plate 14, and gets transmitted through the polarizing beam splitter 13. The returning light having passed through the polarizing beam splitter 13 passes through a sensor lens 18 which includes a cylindrical surface, and is thereupon focused onto a photodetector 19.

A configuration in which the sensor lens 18 is provided with a cylindrical surface so that astigmatism is imparted is adopted so that a focus error signal can be generated using the astigmatic method. The photodetector 19 functions as photoelectric conversion means for converting a received light signal to an electrical signal. The electrical signal outputted from the photodetector 19 travels to a signal processing section, not shown, and in the signal processing section is converted to a playback signal, a focus error signal, a tracking error signal, or the like. The focus error signal is used to perform focusing control as discussed previously, and the tracking error signal is used to perform tracking control as discussed previously.

The semiconductor laser 11, the diffraction grating 12, the polarizing beam splitter 13, the quarter-wave plate 14, the collimator lens 15, the raising mirror 16, the sensor lens 18, and the photodetector 19 are placed on the pickup base 10. The objective lens 17 is placed on the lens holder 20a of the objective lens actuator 20, and arranged on the pickup base 10.

The collimator lens 15 can move in an optical axis direction M (the left-right direction in FIG. 2), the position thereof being moved appropriately in response to a layer jump or the like. The effects of spherical aberration in the optical pickup 1 can be suitably minimized thereby.

The diffraction grating 12 placed on the pickup base 10 undergoes rotational adjustment prior to being secured to the pickup base 10, and is secured to the pickup base 10 once the positions of the light spots formed on the optical disk D have been brought to the desired positions. The optical pickup 1 of the present embodiment is characterized by this diffraction grating 12 adjustment structure. This characteristic point (characterizing configuration) is described below.

The diffraction grating 12 is one example of the optical element to be rotationally adjusted of the present invention. The pickup base 10 is one example of the "non-rotating side where the rotationally adjusted optical element (the diffraction grating 12 in the present embodiment) is securely arranged" of the present invention. In the present embodiment, the diffraction grating 12 is placed on the pickup base 10 in a state of being held by a holder (diffraction grating holder; i.e., one example of the optical element holder of the present invention). The diffraction grating holder (discussed in detail below) holding the diffraction grating 12 is one example of the "rotating side including an optical element to be rotationally adjusted" of the present invention.

Figure 3:
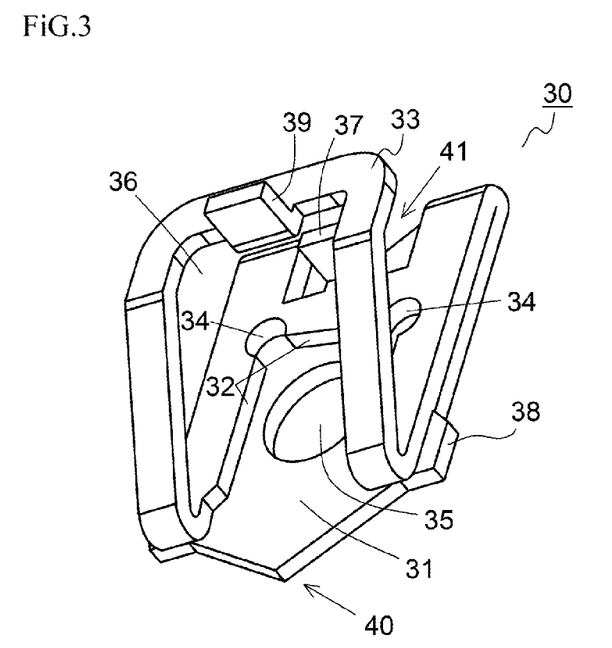
FIG. 3 is a schematic perspective view showing a configuration of a diffraction grating holder provided to the optical pickup of the present embodiment.
Figure 4:
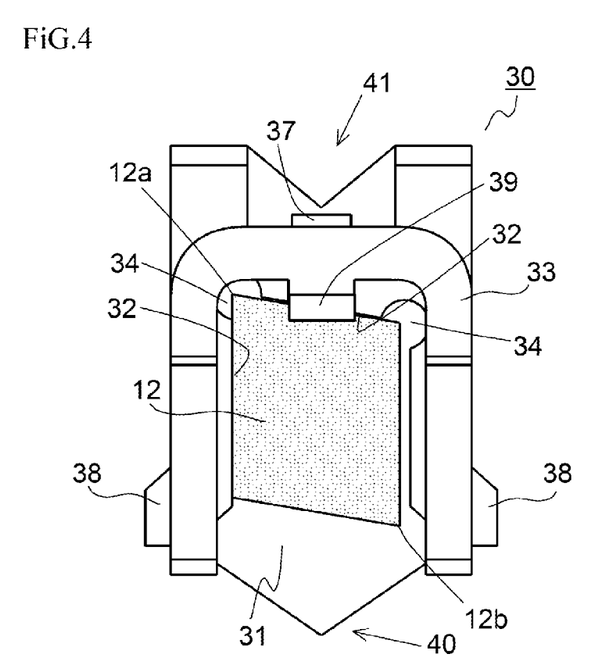
FIG. 4 is a front view showing the configuration of the diffraction grating holder provided to the optical pickup of the present embodiment, and showing the diffraction grating attached.
Figure 5:
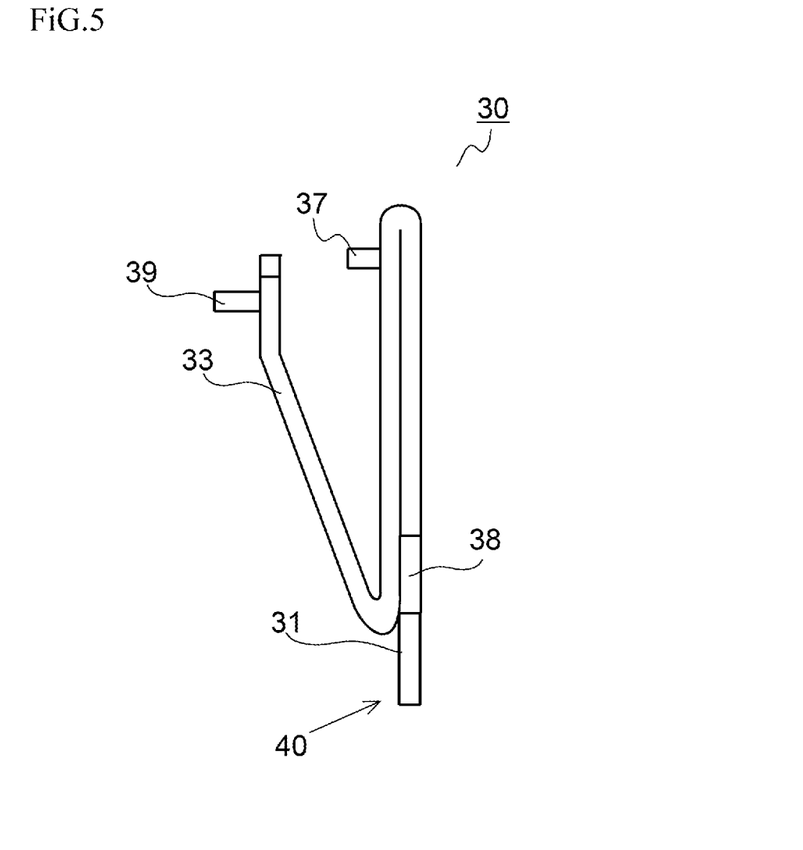
FIG. 5 is a schematic side view showing the configuration of the diffraction grating holder provided to the optical pickup of the present embodiment.

FIG. 3 is a schematic perspective view showing a configuration of the diffraction grating holder provided to the optical pickup of the present embodiment. FIG. 4 is a front view showing the configuration of the diffraction grating holder provided to the optical pickup of the present embodiment, and showing the diffraction grating in an attached state. FIG. 5 is a schematic side view showing the configuration of the diffraction grating holder provided to the optical pickup of the present embodiment.

A diffraction grating holder 30 provided to the optical pickup 1 is obtained by working sheet metal. As shown in FIG. 3, the diffraction grating holder 30 is provided with a placement face 31 on which is placed the diffraction grating 12; a positioning wall 32 obtained by folding the sheet metal, and used for positioning the diffraction grating 12 placed on the placement face 31; and a spring section 33 obtained by a fold different from the fold for obtaining the positioning wall 32.

As shown in FIG. 4, the diffraction grating 12 placed on the placement face 31 is a quadrangular prism of substantially parallel quadrilateral shape as seen in plan view. The diffraction grating 12 is made, for example, of glass; and has a diffraction pattern formed on one of two faces constituting the substantially parallel quadrilateral shape. The diffraction grating 12 is held positioned in the diffraction grating holder 30, two neighboring side faces among the four side faces thereof in a state of being arranged abutting the positioning wall 32.

As shown in FIGS. 3 and 4, the diffraction grating holder 30 is formed having two clearance sections 34 that are substantially semicircular spaces as seen in plan view, the clearance sections intended to protect the corners of the diffraction grating 12 placed on the placement face 31, and service other purposes. The diffraction grating 12 placed on the placement face 31 is secured, for example, using an adhesive or the like. There are no particular limitations as to the adhesion sites for adhesively securing the diffraction grating 12; for example, adhesion sites in the vicinity of two opposing corner sections 12a, 12b of the diffraction grating 12 may be used.

The diffraction grating holder 30 is provided with through-holes 35, 36 so that light can impinge on the diffraction grating 12 placed on the placement face 31, and light can exit the diffraction grating 12 (see FIG. 3).

As shown in FIG. 5 (and in FIGS. 3 and 4), a plastic-deformation-preventing rib 37 is formed on the diffraction grating holder 30 so that the spring section 33 does not bend more than necessary so that plastic deformation occurs. Absent this plastic deformation-preventing rib 37, strong forces to which the spring section 33 is subjected may give rise to plastic deformation of the spring section 33, for example, during attachment of the diffraction grating holder 30 to the pickup base 10, during detachment of the diffraction grating holder 30 previously attached to the pickup base 10 (reworking), or during other events.

In this regard, where the plastic deformation-preventing rib 37 is provided protruding out toward the spring section 33, as in the diffraction grating holder 30 of the present embodiment, plastic deformation of the spring section 33 can be prevented in order for the spring section 33 to be prevented from bending in excess of a given range. The position where the plastic deformation-preventing rib 37 is provided, as well as the number of plastic deformation-preventing ribs 37, are not limited to those in the configuration in the present embodiment; these parameters may be modified appropriately.

The diffraction grating holder 30 is also provided with a substantially V-shaped protruding section 40 whose distal end is used as a center of rotation when rotational adjustment of the diffraction grating 12 is performed, and is provided with a substantially V-shaped jig-engaging section (cutout) 41 provided in an end section opposing the protruding section 40, the jig-engaging section adapted for engaging an adjustment jig (jig for rotational adjustment; see FIGS. 3 and 4). The substantially V-shaped protruding section 40 of the diffraction grating holder 30 is one example of the "tapered distal end section included in the rotating side" of the present invention. The jig-engaging section 41 of the diffraction grating holder 30 is one example of the "contact section included in the rotating side, provided in an end section on a side opposite the distal end section and adapted to be contacted by an adjustment jig."

The diffraction grating holder 30 is also provided with a stopper section 38 for restricting the amount of rotation of (the diffraction grating holder 30) when rotational adjustment of the diffraction grating 12 is performed; and is provided with a grip section 39 formed on the spring section 33 to facilitate grasping of the diffraction grating holder 30 using tweezers or the like (see FIGS. 3 to 5).

Figure 6:
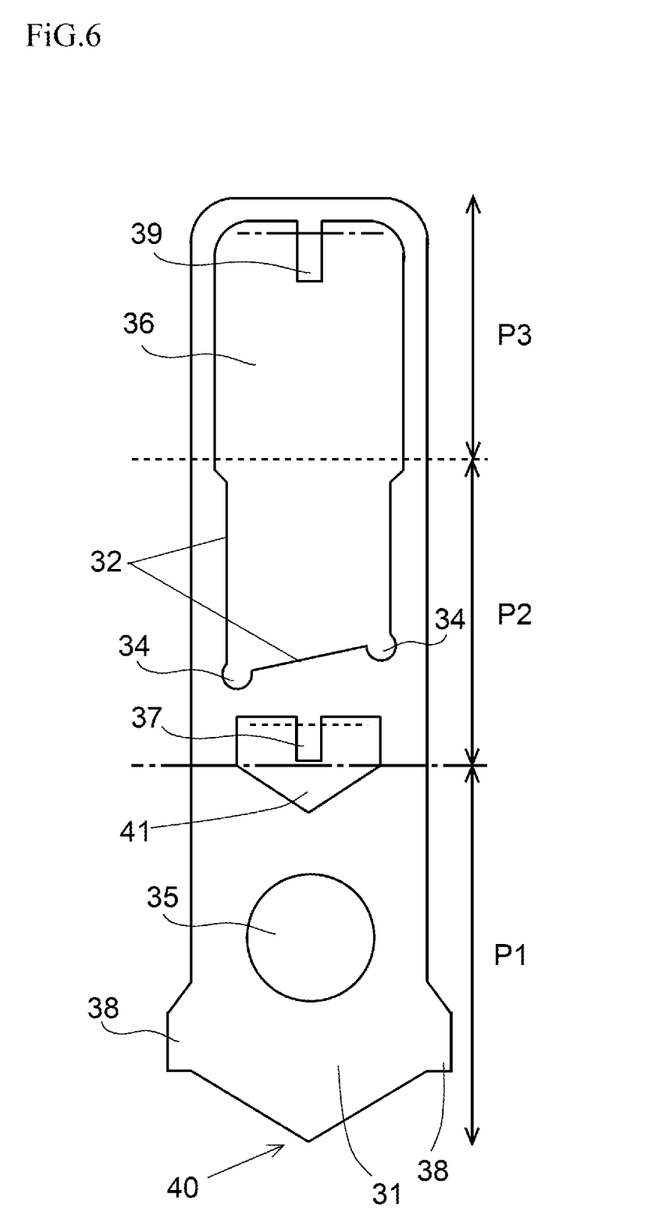
FIG. 6 is a development view showing the configuration of the diffraction grating holder provided to the optical pickup of the present embodiment.

FIG. 6 is a development view showing the configuration of the diffraction grating holder provided to the optical pickup of the present embodiment. In FIG. 6, the broken line shows a site where a mountain fold is made, and the single-dot and dash line shows a site for where a valley fold is made. As shown in FIG. 6, the sheet metal constituting the diffraction grating holder 30 has a first portion P1, a second portion P2, and a third portion P3.

The first portion P1 is formed in a substantially pentagonal shape as seen in plan view, and the diffraction grating 12 is placed on this first portion P1. Specifically, this first portion P1 has the placement face 31 on which the diffraction grating 12 is placed. The through-hole 35 of substantially circular shape as seen in plan view, the stopper section 38, the substantially V-shaped protruding section 40, and the jig-engaging section 41 as discussed previously are formed in this first portion P1. The through-hole 35 and the jig-engaging section 41 are obtained by cutting out portions of the sheet metal.

The second portion P2 (having a profile of substantially rectangular shape) continuing from the first portion P1 is valley-folded (folded over toward the near side with respect to the plane of the drawing with respect to the first portion P1), and overlapped in a state of contacting the first portion P1. Predominantly, most of the portion constituting the second portion P2 is cut away except at the outer circumferential side. In so doing, the positioning wall (step) 32 of a thickness equivalent to that of the sheet metal is formed by folding the second portion P2 and causing it to overlap the first portion P1

(see FIG. 3), so that the diffraction grating 12 is placed on the first portion P1 despite the second portion P2 being folded thereagainst.

The second portion P2 is also provided with cutouts for forming the previously discussed clearance sections 34 (see FIG. 3 and others). A portion serving as the previously discussed plastic deformation-preventing rib 37 is formed in the second portion P2 through mountain-folding (folding toward the distant side with respect to the plane of the drawing).

The third portion P3 (having a profile of substantially rectangular shape) continuing from the second portion P2 is mountain-folded (folded over toward the near side with respect to the plane of the drawing, relative to the valley-folded second portion P2) to form the spring section 33. Predominantly, substantially all of the portion constituting the third portion P3 is cut away except at the outer circumferential side, and the third portion P3 is folded over to obtain the previously discussed through-hole 36. The size of the cut away portion is important not only in terms of ensuring a passage for light, but also as an element for adjusting the resilience of the spring section 33, and the size of the cut away portion is determined in consideration of this point as well.

More specifically, the third portion P3 is slightly bent to adjust the resilience at a position away from the folding position discussed previously. The portion serving as the previously discussed grip section 39 is formed in the third portion P3 by performing a valley fold (folding toward the near side with respect to the plane of the drawing).

Figure 7:
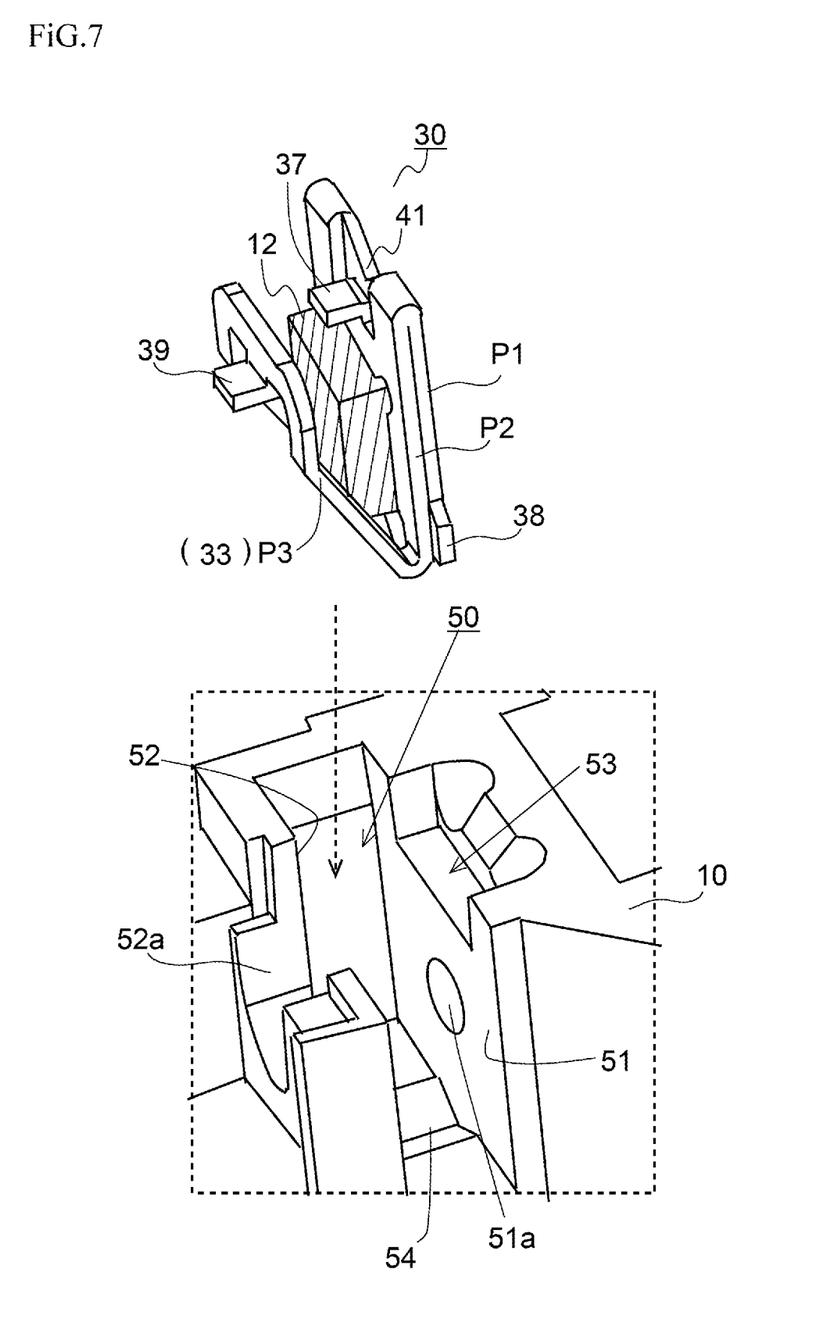
FIG. 7 is a schematic perspective view showing a configuration of an attachment section for attachment of the diffraction grating holder in the optical pickup of the present embodiment.
Figure 8:
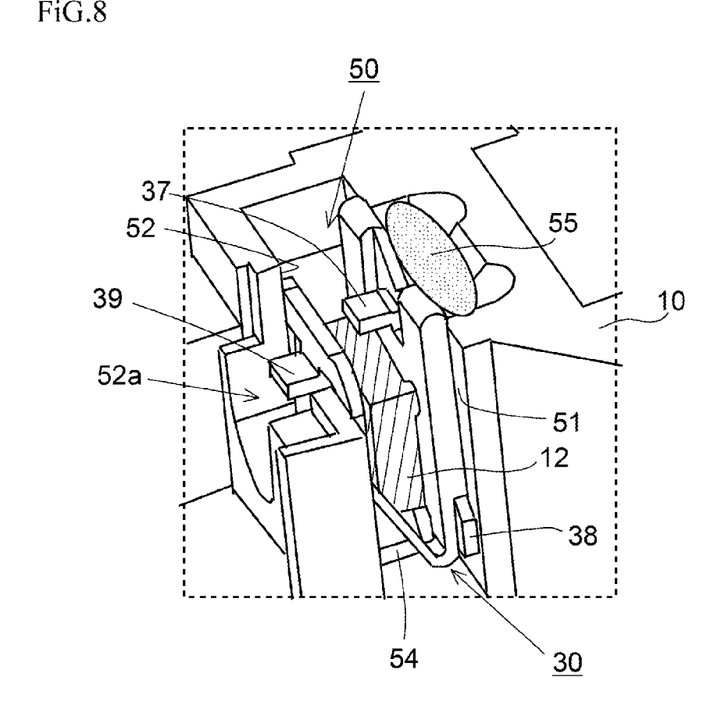
FIG. 8 is a schematic perspective view showing the diffraction grating holder housed in the attachment section shown in FIG. 7.

Next, the configuration of an attachment section 50 for attaching the diffraction grating holder 30 to the pickup base 10 will be described with reference to FIG. 7 and FIG. 8. FIG. 7 is a schematic perspective view showing a configuration of the attachment section for attachment of the diffraction grating holder in the optical pickup of the present embodiment. FIG. 7 also shows the diffraction grating holder 30 (which holds the diffraction grating 12) which is housed toward the direction of the broken line arrow. FIG. 8 is a schematic perspective view showing the diffraction grating holder housed in the attachment section shown in FIG. 7.

In the attachment section 50 are formed a first wall section 51 that abuts the back face of the placement face 31 of the diffraction grating holder 30 (the back face of the face on which the diffraction grating 12 is placed in the first portion P1), and a second wall section 52 that abuts the spring section 33 (the third portion P3) of the diffraction grating holder 30. An optical path hole 51a is formed in the first wall section 51 to permit passage of light from the semiconductor laser 11 (not shown in FIGS. 7 and 8; see FIG. 2). A cutout 52a, which is substantially U-shaped as seen in plan view, is formed in the second wall section 52, in order for light exiting the diffraction grating 12 to reach the polarizing beam splitter 13 (not shown in FIGS. 7 and 8; see FIG. 2). The first wall section 51 and the second wall section 52 are arranged opposedly in the direction of the optical axis of the diffraction grating 12, assuming that the diffraction grating holder 30 is housed in the attachment section 50.

An adhesive packing section 53 into which an adhesive is packed is provided to the upper section of the first wall section 51. A slotted section 54 substantially V-shaped in cross-sectional view and extending in a direction linking the first wall section 51 and the second wall section 52 is formed in the bottom face of the attachment section 50. The direction of extension of the slotted section 54 is a direction substantially parallel to the direction of advance of light passing through the diffraction grating 12 (the direction of the optical axis of the diffraction grating 12). This slotted section 54 is one example of the "recessed section, included in the non-rotating side, for engaging the distal end section (substantially V-shaped protruding section 40)," of the present invention.

When the diffraction grating holder 30 is attached to the attachment section 50, the spring section 33 is caused to undergo elastic deformation, reducing the thickness of the diffraction grating holder 30. At this time, owing to the presence of the plastic deformation-preventing rib 37, the spring section 33 does not bend by more than a predetermined amount in the direction of reduced thickness, and the likelihood of plastic deformation of the diffraction grating holder 30 during attachment is accordingly low.

The diffraction grating holder 30 having been reduced in thickness is lowered in the direction of the dashed arrow in FIG. 7 and housed inside the attachment section 50. At this time, the diffraction grating holder 30 is housed in the attachment section 50 in such a way that the distal end of the substantially V-shaped protruding section 40 of the diffraction grating holder 30 engages within the deepest section (the V-shaped distal end) of the slotted section 54. Once housed in the attachment section 50, the diffraction grating holder 30 is pressed against the first wall section 51 and the second wall section 52 by the resilience of the spring section 33.

As discussed previously, the diffraction grating 12 must undergo rotational adjustment to bring the positions of three spots of light formed on the information recording surface RS of the optical disk D to target positions. For this reason, the resilience of the spring section 33 is adjusted so as to meet the condition that the diffraction grating holder 30 not readily dislodge from the attachment section 50, as well as the condition that rotational adjustment of the diffraction grating 12 be able to be performed through rotation of the diffraction grating holder 30.

This rotational adjustment is performed in the final stage of the optical pickup 1 assembly task. Specifically, the optical components 12 to 18, the semiconductor laser 11, and the photodetector 19 are attached to the pickup base 10, and after position adjustment of the photodetector 19 has been performed using the primary ray, the diffraction grating holder 30 is rotated so as to bring the secondary beams to the target positions, and rotational adjustment of the diffraction grating 12 is performed.

Figure 9:
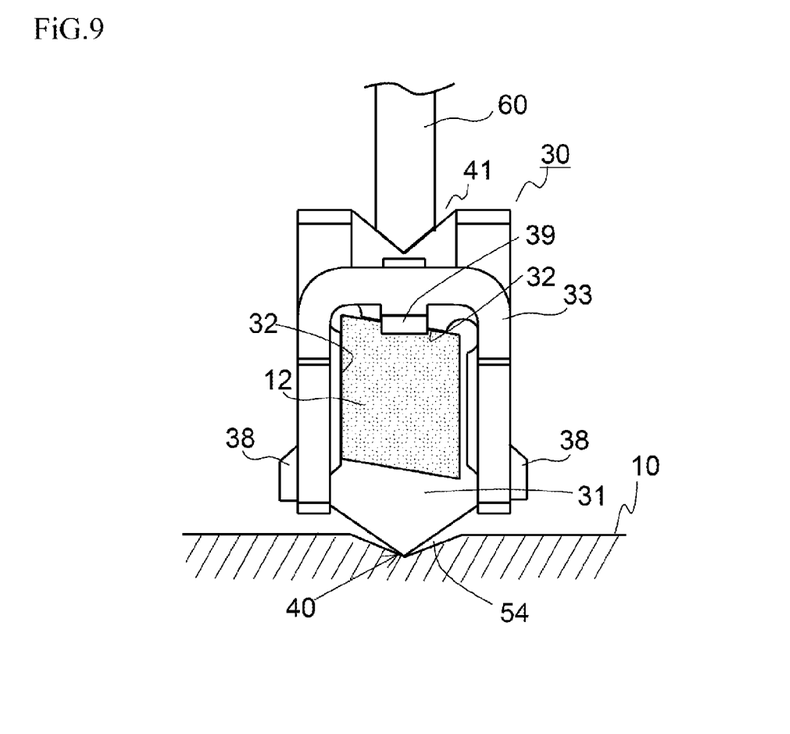
FIG. 9 is a schema showing the relationship of the diffraction grating holder and a slotted section of the attachment section in the optical pickup of the present embodiment.

Rotational adjustment using the adjustment structure of the diffraction grating 12 (optical element) of the present embodiment, as well as the effect thereof, shall now be described with reference to FIG. 9. FIG. 9 is a schema showing the relationship of the diffraction grating holder (one example of the rotating side) and the slotted section of the attachment section (recessed section of the non-rotating side) in the optical pickup of the present embodiment.

As shown in FIG. 9, when rotational adjustment of the diffraction grating 12 is to be performed, an adjustment jig (adjustment pin) 60 engages (contacts) the jig-engaging section 41 of the diffraction grating holder 30. The diffraction grating holder 30 is then rotated using the adjustment jig 60 about the distal end of the V-shaped protruding section 40 as the fulcrum (moving the adjustment pin 60 in the left-right direction in FIG. 9), so as to bring the positions of the light spots to the predetermined positions. In the present embodiment, the fulcrum serves as the center of rotation.

The V shape of the slotted section 54 of the attachment section 50 is gentler than the slope of the protruding section 40 of the diffraction grating holder 30, so that the diffraction grating holder 30 can rotate centered on the distal end of the V-shaped protruding section 40. Also, due to the presence of the stopper section 38 provided to the side face section of the diffraction grating holder 30, the diffraction grating holder 30 does not rotate more than necessary.

Once rotational adjustment of the diffraction grating 12 has concluded, the diffraction grating holder 30 is anchored to the pickup base 10 so as to not move from the adjusted position. The diffraction grating holder 30 may be anchored to the pickup base 10, for example, by a method for introducing an ultraviolet-curing adhesive (UV adhesive) 55 (see FIG. 8) into the adhesive packing section 53 during the stage of rotational adjustment, and irradiating the adhesive using ultraviolet light in a stage where rotational adjustment has concluded.

According to the diffraction grating holder 30 housed in the attachment section 50, the grip section 39 provided to the diffraction grating holder 30 projects into the cutout 52*a*, which is substantially U-shaped as seen in plan view, and is formed in the second wall section 52 (see FIG. 8). Because of this, the grip section 39 can function as a stopper for restricting the amount of rotation of the diffraction grating holder 30. Specifically, in some instances, the grip section 39 may serve as a stopper section in place of the stopper section 38.

According to the diffraction grating 12 adjustment structure of the present embodiment, there is greater distance between the contact section (the jig-engaging section 41) where the adjustment pin 60 contacts the diffraction grating holder 30, and the center of rotation (the distal end of the V-shaped protruding section 40). (As a comparison, there may be cited, for example, the conventional art configuration shown in FIG. 12). For this reason, according to the adjustment structure of the diffraction grating 12 of the present embodiment, the proportion of angular change of the diffraction grating 12 associated with left or right movement of the adjustment pin 60 can be reduced, and the adjustment accuracy of rotational adjustment using the adjustment pin 60 is achieved.

Also, according to the diffraction grating 12 adjustment structure of the present embodiment, after the diffraction grating holder 30 has been adhesively secured to the pickup base 10 (the attachment section 50), the diffraction grating holder 30 will assume a state in which the adhesion sites (in proximity to the jig-engaging section 41) and the distal end of the V-shaped protruding section 40 are secured to the pickup base 10. The distal end of the V-shaped protruding section 40 contacts the deepest section of the V-shaped slotted section 54. For this reason, there is little likelihood of the diffraction grating holder 30 undergoing positional displacement even when temperature change occurs around the diffraction grating 12, shock is applied to the optical pickup 1, or in other cases.

Specifically, the optical pickup 1 employing the diffraction grating 12 adjustment structure of the present embodiment has very high reliability. Additionally, in the present embodiment, the diffraction grating holder 30 is configured using sheet metal. Because of this, there is no need to provide a spring separately, as in cases where the diffraction grating holder is formed of resin, and costs can be readily reduced. Also, a configuration is adopted whereby a step produced by folding the sheet metal is used as the positioning wall 32, the thickness of the step being equivalent to that of the sheet. Because of this, the task for placement of the diffraction grating 12 in the diffraction grating holder 30 is readily accomplished. The diffraction grating holder 30 of the present embodiment is readily obtained by working of sheet metal, and the configuration of the attachment section 50 to which the diffraction grating holder is attached can be a simple one.

The embodiment shown herein is but one example of the present invention; the optical element adjustment structure and optical pickup of the present invention are not limited to the configurations shown herein.

For example, the embodiment shown herein was configured such that the tapered distal end section of the rotating side (the diffraction grating holder 30) served as the V-shaped protruding section 40. However, this configuration is not given by way of limitation to the present invention; the distal end of the tapered distal end section may instead have, for example, a rounded configuration or the like, rather than a pointed one. However, when the rounded portion is too large, the distance between the contact section where contact is made by the adjustment pin 60 (the jig-engaging section 41) and the center of rotation will be shorter, and is it therefore preferable for the distal end of the tapered distal end section to be as pointed as possible. Also, the recessed section (slotted section 54) of the non-rotating side (the pickup base 10) is not limited to being a V shape; in some instances it may be rounded, or the like.

The embodiment shown herein is configured such that the rotating side including the rotationally adjusted diffraction grating 12 is the diffraction grating holder 30 holding the diffraction grating 12. However, the present invention is not limited to application in this particular configuration. Specifically, the rotating side of the present invention may be configured using the rotationally adjusted diffraction grating itself, or may be configured using a rotationally adjusted diffraction grating integrally provided with the holder. In this case, the diffraction grating, or the integrated diffraction grating and holder, may be rotationally adjusted in a state of being temporarily secured to the pickup base 10 by a spring.

In the embodiment shown herein, the jig-engaging section 41 formed in the diffraction grating holder 30 is substantially V-shaped, but it is possible for the shape of the jig-engaging section 41 to be modified appropriately to match the shape of the adjustment jig.

In the embodiment shown herein, the diffraction grating holder 30 is configured having the plastic deformation-preventing rib 37, the stopper section 38, and the grip section 39. However, configurations in which at least one of these is lacking are included in the present invention as well.

According to the embodiment shown herein, the optical element adjustment structure of the present invention is a diffraction grating adjustment structure However, the optical element adjustment structure of the present invention has wide potential application as an adjustment structure for other optical elements requiring rotational adjustment besides diffraction gratings. Nor is the optical element adjustment structure of the present invention limited to application in an optical pickup; as shall be apparent, it may be used in other optical devices as well. Further, the optical pickup in which the optical element adjustment structure of the present invention is applied may differ from the configuration of the present embodiment so as to attain compatibility with a plurality of types of optical disks.

The optical element adjustment structure of the present invention is suited to optical elements that require rotational adjustment, and is suitable, for example, as an adjustment structure for a diffraction grating provided to an optical pickup.

What is claimed is:
1. An optical element adjustment structure comprising:
   a rotating side including an optical element to be rotationally adjusted; and
   a non-rotating side where the rotationally adjusted optical element is securely arranged;
   wherein the rotating side includes a tapered distal end section, and a contact section provided in an end section on a side opposite the distal end section and adapted to be contacted by an adjustment jig;

the non-rotating side includes a recessed section for engaging the distal end section; and the adjustment jig contacting the contact section is moved, whereby the rotating side rotates, the distal end section engaged in the recessed section being used as a fulcrum, and the optical element is rotationally adjusted.

2. The optical element adjustment structure of claim 1 wherein the distal end section and the recessed section are substantially V-shaped.

3. The optical element adjustment structure of claim 1 wherein the rotating side is configured such that the optical element holder holds the optical element; and the distal end section and the contact section are included in the optical element holder.

4. The optical element adjustment structure of claim 3 wherein the optical element holder has a spring section;

the non-rotating side includes two wall sections arranged in opposition; and rotational adjustment of the optical element is performed in a state of the optical element holder pressed against the two wall sections by the action of the spring section.

5. The optical element adjustment structure of claim 4 wherein the optical element holder is obtained by working of sheet metal.

6. An optical pickup including an optical element adjustment structure, wherein the optical element adjustment structure comprises a rotating side including an optical element to be rotationally adjusted; and a non-rotating side where the optical element to be rotationally adjusted is securely arranged;

wherein the rotating side includes a tapered distal end section, and a contact section provided in an end section on a side opposite the distal end section and adapted to be contacted by an adjustment jig;

the non-rotating side includes a recessed section for engaging the distal end section; and the adjustment jig contacting the contact section is moved, whereby the rotating side rotates, the distal end section engaged in the recessed section being used as a fulcrum, and the optical element is rotationally adjusted.

7. The optical pickup of claim 6 wherein the optical element is a diffraction grating.

* * * * *